(12) United States Patent
Ashizaki et al.

(10) Patent No.: US 8,310,812 B2
(45) Date of Patent: Nov. 13, 2012

(54) ELECTRIC DOUBLE LAYER CAPACITOR HAVING A FIRST TERMINAL HAVING A FIRST JOINT AND A SECOND TERMINAL HAVING A SECOND JOINT

(75) Inventors: Masashige Ashizaki, Osaka (JP); Nario Niibo, Osaka (JP); Masayuki Sato, Osaka (JP); Yasuyuki Ito, Osaka (JP); Yukiyasu Sugihara, Kyoto (JP)

(73) Assignee: Panasonic Corporation, Osaka (JP)

( * ) Notice: Subject to any disclaimer, the term of this patent is extended or adjusted under 35 U.S.C. 154(b) by 370 days.

(21) Appl. No.: 12/688,954

(22) Filed: Jan. 18, 2010

(65) Prior Publication Data
US 2010/0188800 A1   Jul. 29, 2010

(30) Foreign Application Priority Data

Jan. 27, 2009 (JP) ................. 2009-014951
Jun. 5, 2009 (JP) ................. 2009-135838
Oct. 8, 2009 (JP) ................. 2009-234044

(51) Int. Cl.
H01G 9/00 (2006.01)
H01G 4/228 (2006.01)
H01G 9/10 (2006.01)
H05K 5/03 (2006.01)

(52) U.S. Cl. ........................... 361/502; 361/520
(58) Field of Classification Search ............ 361/502, 361/535, 536, 537, 538, 520, 517, 518, 519
See application file for complete search history.

(56) References Cited

U.S. PATENT DOCUMENTS 4,582,767 A * 4/1986 Morioka et al. .............. 429/121
4,619,873 A * 10/1986 Ishikura et al. ................. 429/48
4,663,824 A * 5/1987 Kenmochi .................... 29/25.03
5,065,286 A * 11/1991 Kurabayashi et al. ........ 361/502
5,850,331 A 12/1998 Matsumoto et al.
6,650,531 B2 * 11/2003 Ikeda et al. .................... 361/502
6,673,488 B2 * 1/2004 Furusaki ....................... 429/163
7,031,140 B2 * 4/2006 Omura et al. ................. 361/517
7,410,723 B2 * 8/2008 Kim et al. ..................... 429/175
7,417,845 B2 * 8/2008 Higashi et al. ................ 361/502
2007/0115614 A1 * 5/2007 Kida ............................. 361/540
2007/0215926 A1 * 9/2007 Mitsuda et al. ............... 257/298
2009/0096041 A1 * 4/2009 Sakakibara et al. ........... 257/419

FOREIGN PATENT DOCUMENTS

| JP | 05-234814 A | | 9/1993 |
| JP | 11260673 A | * | 9/1999 |
| JP | 2001052967 A | * | 2/2001 |
| JP | 3423852 B | | 4/2003 |
| JP | 2003133184 A | * | 5/2003 |

* cited by examiner

Primary Examiner — David M Sinclair
(74) Attorney, Agent, or Firm — Pearne & Gordon LLP

(57) ABSTRACT

An electric double layer capacitor has an element, a first terminal, a second terminal, a resin-made case, and a resin-made lid. A pair of electrodes are led out of the element. Each of the electrodes is connected to each of the first terminal and the second terminal. The element and an electrolyte are accommodated in the case having an opening top surface, and the lid is bonded to the top surface of the case. The joints of the first and second terminals are disposed at positions higher than the inner bottom of the case, and are exposed upward. The rims of the joints and intermediate conductive sections continuing from them are buried in the case, and the terminal sections continuing from the intermediate conductive sections are led from the side surface of the case to the outside.

16 Claims, 13 Drawing Sheets

ELECTRIC DOUBLE LAYER CAPACITOR HAVING A FIRST TERMINAL HAVING A FIRST JOINT AND A SECOND TERMINAL HAVING A SECOND JOINT

BACKGROUND OF THE INVENTION

1. Field of the Invention

The present invention relates to an electric double layer capacitor used for various electronic devices, electric devices, and mobile devices.

2. Background Art

An electric double layer capacitor is an element that uses electric energy accumulated in an electric double layer formed on the interface between a polarized electrode and an electrolyte. The electric double layer capacitor can be downsized and can perform charge/discharge of a large capacity. The electric double layer capacitor is thus used widely for backing up a microcomputer, memory or timer, or for assisting various power sources.

FIG. 18 is a sectional view of a conventional electric double layer capacitor. Electric double layer capacitor 41 has a plurality of electrode plates 43, separator 42, and current collecting members 44. Long separator 42 is impregnated with an electrolyte, and is alternately folded in different directions at predetermined lengths like an accordion. Electrode plates 43 are stacked on each other via separator 42 therebetween so that mutually different poles face each other. Flexible current collecting members 44 have substantially the same width as electrode plates 43, are connected to the ends of respective electrode plates 43, and are buried over the whole length of electrode plates 43.

One end of each electrode plate 43 is covered with separator 42 folded like the accordion, and the other end, which is not covered with separator 42, is exposed on a side surface. Current collecting members 44 are led out of the laminated portion of separator 42 at the end on the exposed side. The ends of respective electrode plates 43 are exposed on the alternately opposite side surfaces, so that current collecting members 44 of respective poles are bundled using bundling member 45 whose sectional view is C shape. Bundling members 45 are made of conductive material.

Bundle parts 46 and 47 of collecting members 44 bundled by bundling members 45 are disposed on the outermost sides of different stacking directions of electrode plates 43 for respective poles. In other words, bundle part 46 is disposed on the uppermost side, and bundle part 47 is disposed on the lowermost side. Electric double layer capacitor 41 having this structure is used in a manner that a plurality of electric double layer capacitors 41 are stacked on each other in the stacking direction of electrode plates 43.

As discussed above, in electric double layer capacitor 41, flexible current collecting members 44 connected to the ends of respective electrode plates 43 are led out of the laminated portion of separator 42, and are bundled for the respective poles. Thus, risk of damaging separator 42 when current collecting members 44 are connected to respective electrode plates 43 is not caused, so that electric double layer capacitor 41 can be easily manufactured. A plurality of electric double layer capacitors 41 can be easily connected in series by stacking.

In this structure, however, electric double layer capacitor 41 impregnated with an electrolyte needs to be sealed using a case member made of polytetrafluoroethylene (PTFE) as insulating resin. Additionally, a pair of electrodes cannot extend in the same direction. Therefore, the product size is enlarged, and the cost is high.

SUMMARY OF THE INVENTION

An electric double layer capacitor of the present invention has an element, a first terminal, a second terminal, an electrolyte impregnated in the element, a resin-made case, and a resin-made lid. The element has a first electrode having a first lead section, a second electrode having a second lead section that projects in the same direction as the first lead section, and a separator. The separator is interposed between the first electrode and the second electrode. The first terminal is connected to the first lead section, and the second terminal is connected to the second lead section. The case accommodating the element has an inner bottom, a first surface facing the inner bottom and a side surface adjacent to the first surface, and the first surface is opened. The lid is bonded to the first surface. The first terminal includes a first joint having a joint surface to which the first lead section is joined, a first intermediate conductive section extended from the first joint, and a first terminal section further extended from the first intermediate conductive section. The second terminal includes a second joint having a second joint surface to which the second lead section is joined, a second intermediate conductive section extended from the second joint, and a second terminal section further extended from the second intermediate conductive section. The first and second joints are disposed at positions closer to the first surface than the inner bottom of the case. The first and second joint surfaces are exposed toward the first surface. The rims of the first and second joints and the first and second intermediate conductive sections are buried in the case, and the first and second terminal sections are guided from the side surface of the case.

DETAILED DESCRIPTION OF THE INVENTION

Exemplary embodiments of the present invention will be hereinafter described with reference to the accompanying drawings. In each exemplary embodiment, components similar to those in the preceding exemplary embodiment are denoted with the same reference marks, and the detailed descriptions of those components may be omitted.

First Exemplary Embodiment

Figure 1:
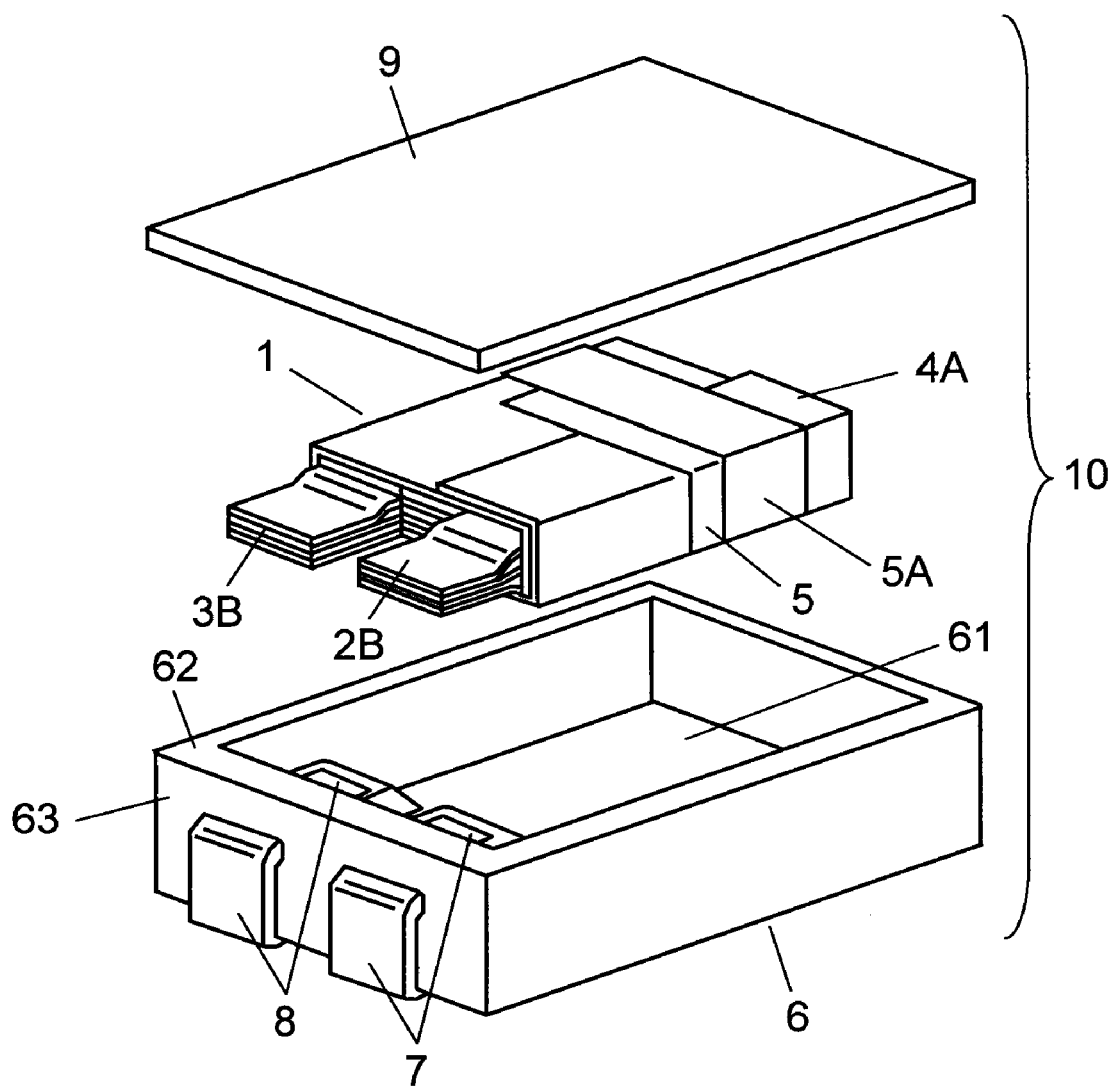
FIG. 1 is an exploded perspective view of an electric double layer capacitor in accordance with a first exemplary embodiment of the present invention.
Figure 2A:
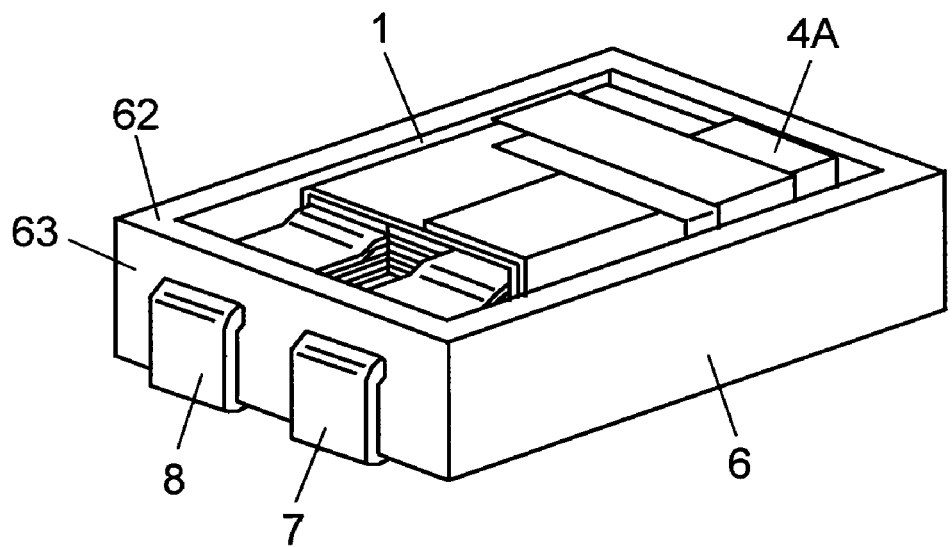
FIG. 2A is a perspective view showing a state before bonding a lid of the electric double layer capacitor in accordance with the first exemplary embodiment of the present invention.
Figure 2B:
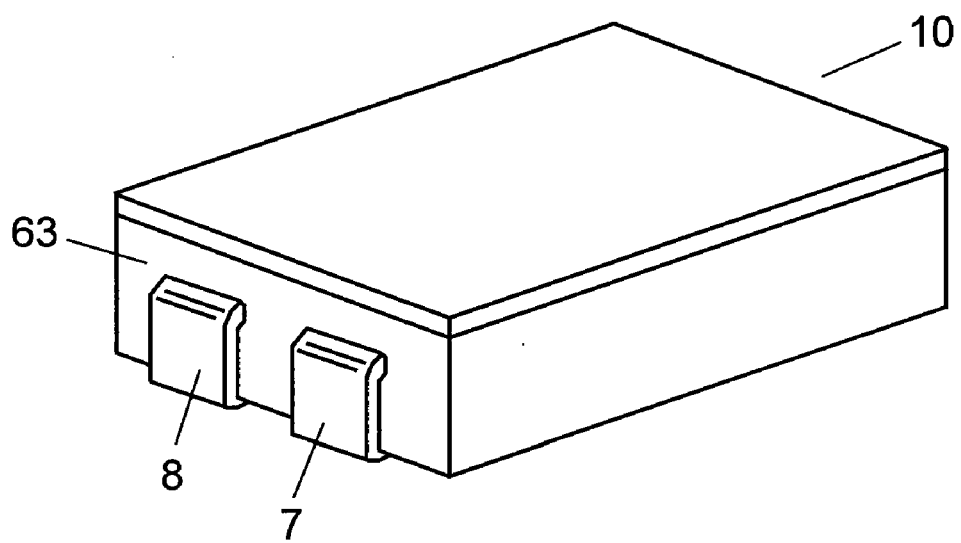
FIG. 2B is a perspective view showing the bonded state of the lid of the electric double layer capacitor shown in FIG. 2A.
Figure 3A:
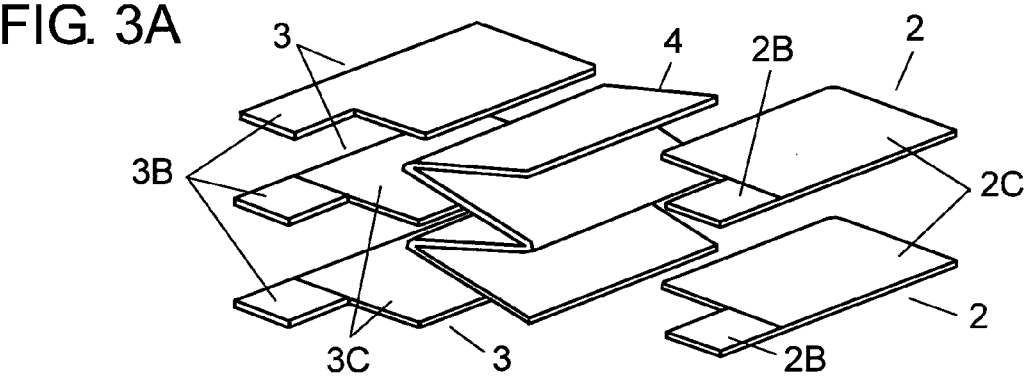
FIG. 3A through FIG. 3D are perspective views of manufacturing steps for illustrating the structure of an element of the electric double layer capacitor shown in FIG. 1.

FIG. 1 is an exploded perspective view of an electric double layer capacitor in accordance with a first exemplary embodiment of the present invention. FIG. 2A is a perspective view showing a state before bonding a lid of the electric double layer capacitor, and FIG. 2B is a perspective view showing the bonded state of the lid. FIG. 3A through FIG. 3D are perspective views of manufacturing steps for illustrating the structure of an element used in the electric double layer capacitor. FIG. 4 is a sectional view of the element. In FIG. 1 through FIG. 4, the stacking number is reduced to simply describe the structure of element 1. In actuality, several tens of positive electrodes 2 and negative electrodes 3 are alternately stacked on each other. This manner is used also in a structure described later.

As shown in FIG. 1, electric double layer capacitor 10 has element 1, first terminal 7, second terminal 8, an electrolyte (not shown), resin-made case 6 having opening top surface 62, and resin-made lid 9. Top surface 62 is a first surface that faces inner bottom 61. As shown in FIG. 1 and FIG. 3A through FIG. 3D, element 1 has a plurality of sheet-like positive electrodes 2 as first electrodes, a plurality of sheet-like negative electrodes 3 as second electrodes, and band-like separator 4 interposed between positive electrodes 2 and negative electrodes 3. Each of positive electrodes 2 has first lead section 2B, and each of negative electrodes 3 has second lead section 3B. Positive electrodes 2 and negative electrodes 3 are stacked on each other via separator 4 so that first lead sections 2B and second lead sections 3B are pointed in the same direction (same side of element 1). First terminal 7 is connected to first lead sections 2B, and second terminal 8 is connected to second lead sections 3B. First terminal 7 and second terminal 8 are buried in case 6. Element 1 is impregnated with the electrolyte. Case 6 accommodates element 1 therein, and lid 9 is bonded to top surface 62 of case 6 and seals the opening part of case 6. Case 6 and lid 9 are made of liquid crystal polymer, for example.

Next, a producing procedure of element 1 is described with reference to FIG. 3A through FIG. 3D. First, as shown in FIG. 3A, a plurality of sheet-like positive electrodes 2 and negative electrodes 3, and sheet-like separator 4 are prepared. Each positive electrode 2 is produced as follows. Projecting tongue-shaped first lead section 2B is firstly disposed integrally at the end of one side of a rectangular current collector made of aluminum foil. Polarized electrode layers 2C are then formed on both surfaces of the current collector except first lead section 2B. Negative electrodes 3 are produced similarly to positive electrodes 2. In other words, projecting tongue-shaped second lead section 3B is disposed integrally at the end of one side of a rectangular current collector made of aluminum foil. Polarized electrode layers 3C are formed on both surfaces of the current collector except second lead section 3B. Separator 4 is made of non-woven fabric of cellulosic fiber of high heat resistance, for example. Separator 4 is folded in a zigzag shape like an accordion and is used as a plurality of sheets continuous connected to each other.

Figure 3B:
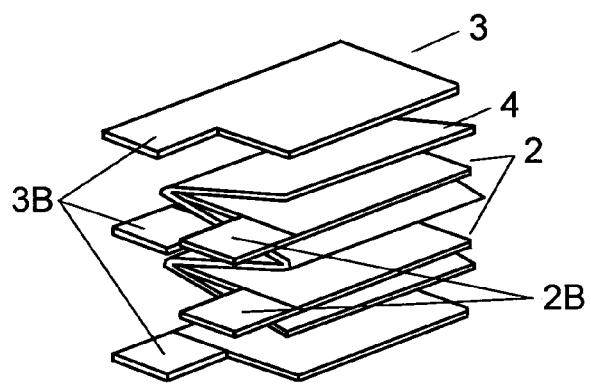
Figure 3C:
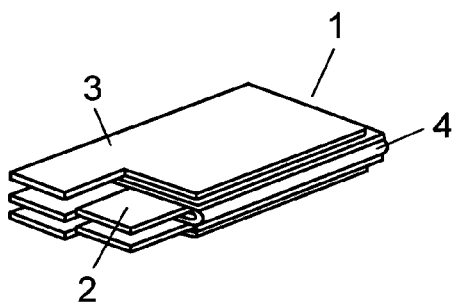
Figure 3D:
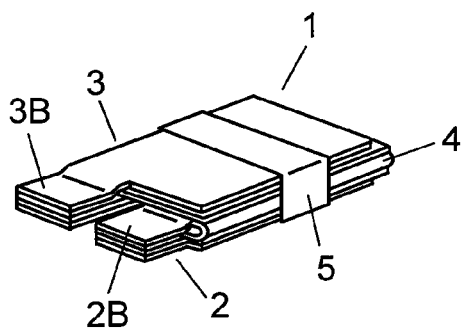
Figure 4:
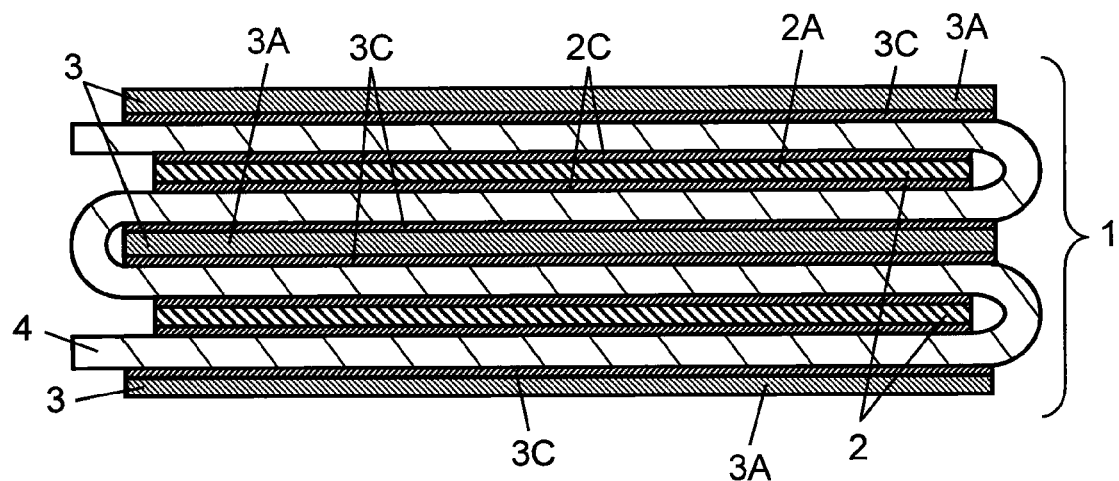
FIG. 4 is a sectional view of the element shown in FIG. 3D.

Next, as shown in FIG. 3B, positive electrodes 2 and negative electrodes 3 are alternately inserted between the sheets of separator 4 from the opposite directions so that first lead sections 2B and second lead sections 3B are arranged at the opposite ends of the same side. Thus, as shown in FIG. 3C, element 1 is formed in a stacked structure. In other words, element 1 has a plurality of positive electrodes 2 and negative electrodes 3, and positive electrodes 2 and negative electrodes 3 are stacked on each other via separator 4. Finally, as shown in FIG. 3D, winding-stop tape 5 is wound on the outer periphery.

It is preferable that first lead sections 2B disposed in positive electrodes 2 and second lead sections 3B disposed in negative electrodes 3 are formed so that the width of them is smaller than ½ of the whole width of the side on which the lead sections are formed. This dimension design prevents first lead sections 2B and second lead sections 3B from coming into contact with each other and causing short circuit.

Each positive electrode 2 has polarized electrode layers 2C on both surfaces of current collector 2A. In a case that negative electrodes 3 are disposed on the uppermost and the lowermost in the stacking direction as shown in FIG. 4, it is preferable that polarized electrode layer 3C is formed on only one surface of current collector 3A except second lead section 3B in negative electrode 3 disposed on each of the uppermost and the lowermost. Each polarized electrode layer 3C abuts on each of the sheet on the uppermost and the sheet on the lowermost of separator 4. In this structure, the area of negative electrodes 3 is larger than the area of positive electrodes 2. Therefore, corrosion reaction occurring in a local part of positive electrodes 2 is suppressed, and hence element 1 can exhibit stable performance.

As shown in FIG. 1, it is preferable that sheet-like stainless steel 5A is wound on the sides of element 1 other than the side having first lead sections 2B and second lead sections 3B. Stainless steel 5A is wound on element 1 so as to keep element 1 in the compressed state where element 1 is compressed vertically (stacking direction). By winding stainless steel 5A on the outer periphery of element 1, the contact of positive electrode 2 with separator 4 and the contact of negative electrode 3 with separator 4 can be further improved. Thus, the equivalent series resistance (ESR) characteristic is improved. The swelling of element 1 during driving of the electric double layer capacitor can be suppressed. Therefore, the phenomenon that the distance between positive electrodes 2 and negative electrodes 3 is increased by the swelling or the like and the degrading in ESR characteristic can be suppressed. In addition, stainless steel 5A contains chrome and nickel, so that the corrosion resistance to an electrolyte is high and the possibility of varying the characteristic of element 1 is low.

As shown in FIG. 1 and FIG. 2, insulating paper 4A is wound on the outer periphery of element 1, and winding-stop tape 5 is wound on insulating paper 4A. The presence or absence of insulating paper 4A is selected appropriately as required.

Thus, in forming element 1 in such a manner, the workability is improved by the simple structure of element 1. High dimension accuracy can be secured simply by the following method: positive electrodes 2 and negative electrodes 3 are alternately inserted, from the opposite directions, between the sheets of band-like separator 4 that is folded in the zigzag shape.

Polarized electrode layers 2C and 3C formed in positive electrode 2 and negative electrodes 3, respectively, are produced by kneading activated carbon powder, carbon black, and a binder. As the activated carbon powder, a material is used that is produced by activating the row material such as wood flour base, coconut shell base, phenol resin base, petroleum coke base, coal coke base, or pitch base. As the binder, a mixture of polytetrafluoroethylene and a water-soluble binder of carboxymethyl cellulose is used, for example.

As a material forming separator 4, cellulosic fiber or synthetic fiber can be used. As the cellulosic fiber, cellulose, rayon, kraft, Manila hemp, hemp, or esparto is used. As the synthetic fiber, the following material is used: polypropylene, polyethylene, polyamide, polybutylene-terephthalate, polycarbonate, polyacetal, modified polyphenylene oxide, polyphenylene-sulfide, poly(etheretherketone), poly(ethersulfone), polysulfone, polyamide-imide, polyether-imide, polyimide, polyallylate, polyallylethernitrile, polytetrafluoroethylene.

Figure 5:
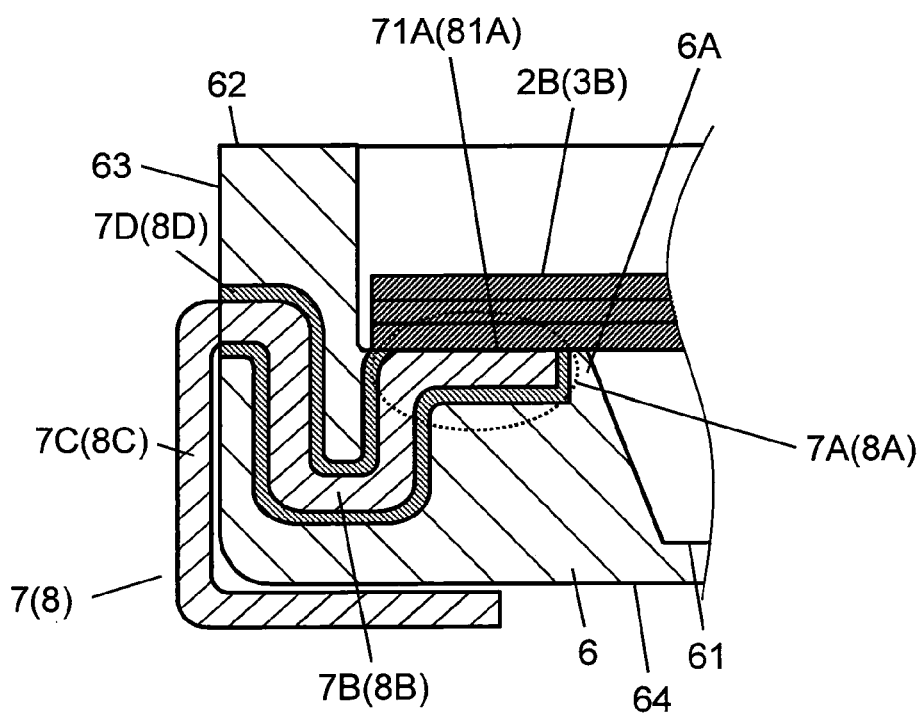
FIG. 5 is a sectional view of an essential part showing a structure of a terminal buried in the case of the electric double layer capacitor shown in FIG. 1.

Next, the structures of first terminal 7 and second terminal 8 are described mainly with reference to FIG. 5. FIG. 5 is a sectional view showing the structures of first terminal 7 and second terminal 8 that are insert-molded in case 6.

First terminal 7 has first joint 7A, first intermediate conductive section 7B, and first terminal section 7C. First joint 7A has first joint surface 71A to which first lead sections 2B of element 1 are joined. First intermediate conductive section 7B is extended from first joint 7A, and first terminal section 7C is further extended from first intermediate conductive section 7B. Similarly, second terminal 8 has second joint 8A, second intermediate conductive section 8B, and second terminal section 8C. Second joint 8A has second joint surface 81A to which second lead sections 3B of element 1 are joined. Second intermediate conductive section 8B is extended from second joint 8A, and second terminal section 8C is further extended from second intermediate conductive section 8B.

First terminal 7 and second terminal 8 penetrate side surface 63 of case 6 by insert molding. Specifically, first joint 7A and second joint 8A are disposed in step part 6A that is formed at a position higher than inner bottom 61 of case 6, and are exposed upward. In other words, first joint 7A and second joint 8A are disposed at positions closer to top surface 62 than inner bottom 61 of case 6, and first joint surface 71A and second joint surface 81A are exposed toward top surface 62.

The rim of first joint 7A, the rim of second joint 8A, first intermediate conductive section 7B, and second intermediate conductive section 8B are buried in case 6. First terminal section 7C and second terminal section 8C are led to the outside through side surface 63 of case 6. Side surface 63 is adjacent to top surface 62.

In other words, step part 6A higher than inner bottom 61 of case 6 is formed in the inside of side surface 63 of case 6. The rims of joints 7A and 8A and intermediate conductive section 7B and 8B are buried in the resin of case 6. Thanks to this structure, first terminal 7 and second terminal 8 are hardly affected by the stress that is applied to the inside of case 6 during increase in internal pressure of case 6.

Since joints 7A and 8A are disposed at the positions higher than inner bottom 61 of case 6, and exposed upward, the electrolyte impregnated in element 1 hardly comes into contact with joints 7A and 8A. Therefore, the electrolyte hardly comes between joint 7A or 8A and case 6, thereby suppressing the leakage. The leak path of the electrolyte is longer than that of the conventional structure, therefore the possibility that the electrolyte leaks to the outside reduces. As a result, the reliability of the capacitor can be increased.

It is preferable to set the height of step part 6A to be about ½ of the height of element 1 stored in case 6. In other words, it is preferable to set the distance from inner bottom 61 to first joint surface 71A or second joint surface 81A to be about ½ of the dimension of element 1 in the direction from inner bottom 61 to top surface 62. In this dimension design, first lead sections 2B and second lead sections 3B disposed in element 1 are crushed and pressed against first terminal 7 and second terminal 8, respectively. Then, first lead sections 2B are joined to first terminal 7, and second lead sections 3B are joined to second terminal 8 by ultrasonic welding or the like. At this time, the load applied to first lead section 2B and second lead sections 3B can be reduced. The phenomenon that the electrolyte impregnated in element 1 comes around from inner bottom 61 of case 6 to first terminal 7 and second terminal 8 can be suppressed. Thus, adverse effect can be prevented during the work in which lid 9 is joined to case 6 by ultrasonic welding or the like.

It is preferable to fold terminal sections 7C and 8C from side surface 63 to outer bottom 64 along the outer surface of case 6. Thus, electric double layer capacitor 10 has first terminal 7 and second terminal 8 on outer bottom 64 of case 6, and is allowed to be surface-mounted.

Intermediate conductive sections 7B and 8B are formed by folding parts of terminals 7 and 8. In addition, intermediate conductive sections 7B and 8B may be disposed in step part 6A in case 6. Thus, it is preferable that intermediate conductive sections 7B and 8B are folded in the resin forming case 6. This structure allows the length of first terminal 7 and second terminal 8 from the inside of case 6 to the outside to be extended. Therefore, the leak of the electrolyte stored in case 6 and the ingress of moisture from the outside can be suppressed.

As shown in FIG. 5, in first terminal 7 and second terminal 8, fluororesin-made coating layers 7D and 8D may be formed in the range from the end on the side in contact with the electrode of element 1 to a part exposed to the outside of case 6. First terminal 7 and second terminal 8 are made of metal, and case 6 is made of resin. Coating layers 7D and 8D reduce the possibility that clearance between first terminal 7 or second terminal 8 and case 6 is caused due to the difference between the thermal expansion coefficient of first terminal 7 and second terminal 8 and that of case 6. Therefore, the ingress of moisture from the outside to the inside of case 6 can be prevented, and the leak of the electrolyte from the inside of case 6 to the outside can be prevented.

As the fluororesin, especially, liquid fluoroelastomer is preferably used. Liquid fluoroelastomer has high heat resistance and is in a liquid form. Therefore, it is easily applied to first terminal 7 and second terminal 8. In addition, using liquid fluoroelastomer having self-adhesion allows increase in adherence to first terminal 7 and second terminal 8, and allows further improvement in reliability as the electric double layer capacitor.

Coating layers 7D and 8D may be extended to the parts of first terminal 7 and second terminal 8 folded from the side surface to the bottom of case 6. In this case, coating layers 7D and 8D play a role also as surface protective layers of first terminal 7 and second terminal 8. Alternatively, coating layers 7D and 8D may be applied to only the boundary between first and second terminals 7 and 8 and case 6. Even in this structure, leak of electrolyte to the outside from the clearance between first terminal 7 or second terminal 8 and case 6 can be prevented, and the ingress of moisture from the outside can be prevented. The various structures related to the terminals described above can be applied to the second exemplary embodiment described later.

Resin-made lid 9 is disposed so as to close the opening of top surface 62 of case 6, and is bonded to case 6 by a method such as ultrasonic welding. By bonding lid 9 to top surface 62 of case 6, electric double layer capacitor 10 of the present exemplary embodiment is completed.

Figure 6:
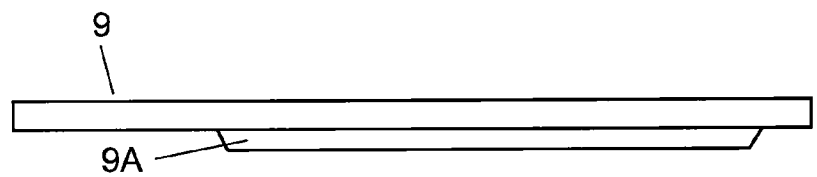
FIG. 6 is a side view of the lid of the electric double layer capacitor shown in FIG. 1.

As shown in FIG. 6, it is preferable that projecting part 9A is disposed on lid 9 so that it rises from a part of the back surface (the side facing case 6) of lid 9 toward the inside. FIG. 6 is a side view of lid 9. Projecting part 9A compresses element 1 accommodated in case 6 in the stacking direction. Therefore, the contact between positive electrode 2 and separator 4 and the contact between negative electrode 3 and separator 4 are improved, and hence the ESR characteristic can be improved.

It is preferable that projecting part 9A is disposed in an area of 15% or larger of the area of element 1 except first lead section 2B of each positive electrode 2 and second lead section 3B of each negative electrode 3, and has a height at which the compressibility of element 1 in the stacking direction is 0.5% to 20%. Disposing projecting part 9A of such a dimension can prevent swelling of element 1 to prevent unnecessarily increase in resistance, and can increase the strength of lid 9. This structure can be applied to the second exemplary embodiment described later.

As a solvent used for the electrolyte, one or a mixture of two or more selected from the following materials can be used: propylene carbonate, γ-butyrolactone, ethylene carbonate, sulfolane, acetonitrile, dimethyl carbonate, diethyl carbonate, and methyl ethyl carbonate. As the cation of the electrolyte salt, quaternary ammonium, quaternary phosphonium, or imidazolium salt can be used. As the anion of the electrolyte salt, $BF_4^-$, $PF_6^-$, $ClO_4^-$, $CF_3SO_3^-$, or $N(CF_3SO_2)_2^-$ can be used.

When water comes into electric double layer capacitor 10, gas occurs due to electrolysis of the water, the performance of the capacitor deteriorates, and the capacitor is broken in the worst case. The materials forming case 6 and lid 9 are therefore required to have low moisture permeability and a property of releasing the gas having occurred inside to the outside. Therefore, case 6 and lid 9 are preferably made of resin rather than metal. As the resin, liquid crystal polymer, PEEK (poly (etheretherketone)), or polyamide can be used. Especially, liquid crystal polymer is preferable because its moisture permeability is lower than the other resins by two or more digits.

Electric double layer capacitor 10 of the present embodiment having such a structure has element 1 that is formed by arranging first lead sections 2B of positive electrodes 2 and second lead sections 3B of negative electrodes 3 in the same direction and by stacking them. Element 1 is accommodated in case 6 having opening top surface 62, and lid 9 is bonded to case 6. First lead sections 2B and second lead sections 3B that are led out of element 1 are connected to first terminal 7 and second terminal 8 that are disposed in case 6, respectively. Such simple structure can achieve cost reduction through reduction of the number of components and reduction of working man-hour. By leading out a pair of electrodes in the same direction, downsizing and resistance reduction can be achieved.

Figure 7:
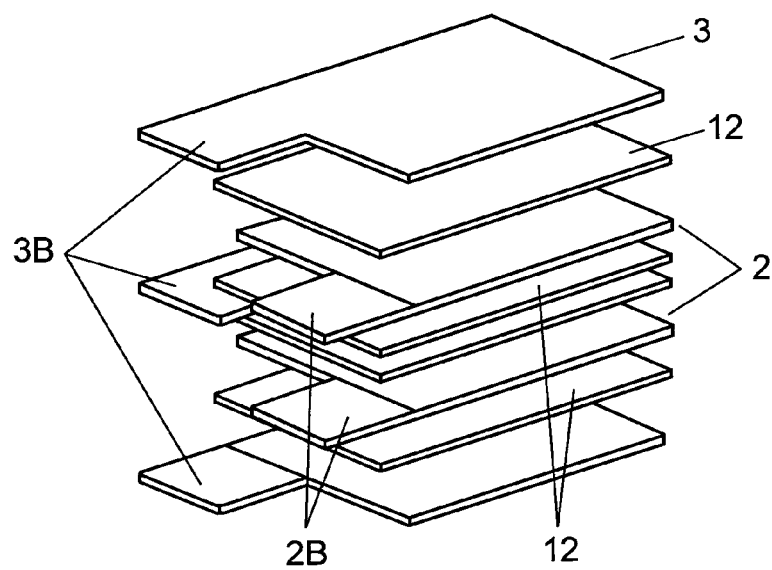
FIG. 7 is an exploded perspective view of another element used in the electric double layer capacitor in accordance with the first exemplary embodiment of the present invention.
Figure 8:
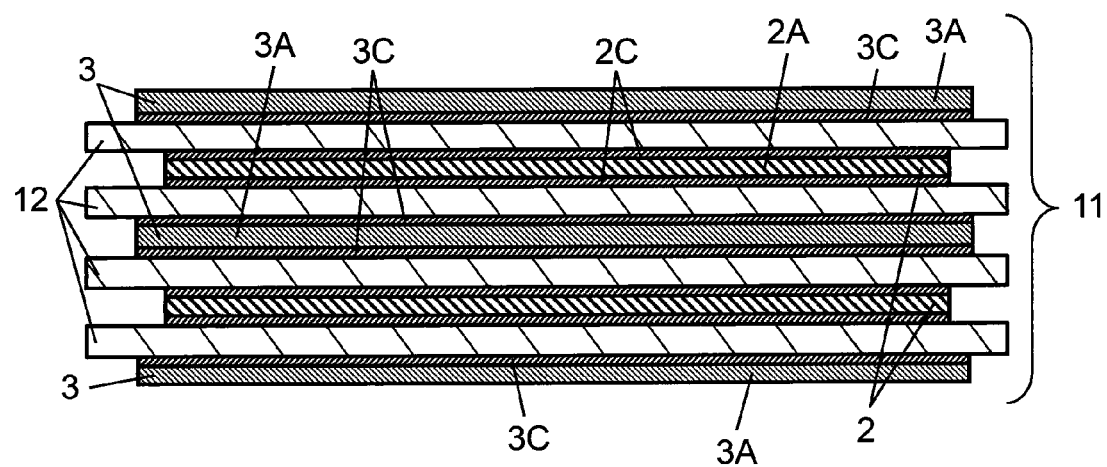
FIG. 8 is a sectional view of the element shown in FIG. 7.

Next, a different structure of the element is described. FIG. 7 and FIG. 8 are exploded perspective view and sectional view of another element used in the electric double layer capacitor in accordance with the first exemplary embodiment, respectively. Element 11 has a structure that is partially different from that of element 1 used in electric double layer capacitor 10 described in FIG. 1 through FIG. 4.

Element 11 has sheet-like positive electrodes 2 as the first electrodes, sheet-like negative electrodes 3 as the second electrodes, and sheet-like separators 12 interposed between positive electrodes 2 and negative electrodes 3. Positive electrodes 2 and negative electrodes 3 are similar to those in FIG. 3A and FIG. 4, so that the descriptions of them are omitted. Separators 12 are made of cellulosic fiber similarly to separator 4 of FIG. 3A and FIG. 4. Thus, the electric double layer capacitor has a plurality of positive electrodes 2, negative electrodes 3, and separators 12, and is formed by stacking each of positive electrodes 2 and each of negative electrodes 3 through each separator 12.

Positive electrodes 2 and negative electrodes 3 are stacked on each other while respective separators 12 are interposed between them so that first lead sections 2B and second lead sections 3B are arranged at the opposite ends of the same side. Finally, winding-stop tape (not shown) is, wound on the outer periphery, thereby producing element 11.

Each positive electrode 2 has polarized electrode layers 2C formed on both surfaces of current collector 2A. When negative electrodes 3 are disposed on the uppermost and the lowermost in the stacking direction as shown in FIG. 8, it is preferable that polarized electrode layer 3C is formed on only one surface of current collector 3A except second lead section 3B in negative electrode 3 disposed on each of the uppermost and the lowermost. The reason for this is similar to the above-mentioned reason.

Since element 11 having such a structure can be produced simply by stacking positive electrodes 2, separators 12, and negative electrodes 3 on each other, element 11 can be easily produced comparing with the case where element 1 is used. This structure can be applied to the second exemplary embodiment described later.

In elements 1 and 11 shown in FIG. 4 and FIG. 8, positive electrodes 2 and negative electrodes 3 are stacked on each other through separator 4 or separators 12. However, the element may be formed by stacking a long positive electrode and a negative electrode on each other through a separator, and then by winding them in the longitudinal direction. Also in this case, when a first lead section and a second lead section are disposed so as to project to the same winding end surface of the element, the electric double layer capacitor can be formed by connecting the first lead section to first terminal 7 and connecting the second lead section to second terminal 8.

Figure 9:
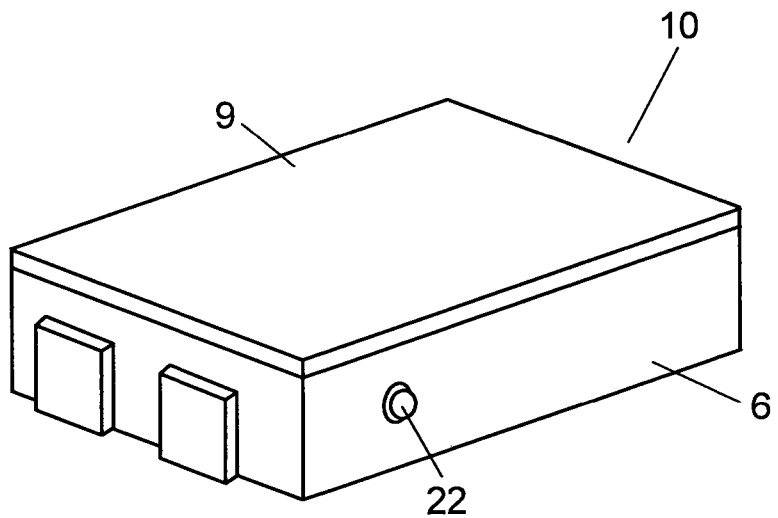
FIG. 9 is a perspective view of another electric double layer capacitor in accordance with the first exemplary embodiment of the present invention.

Next, a more preferable structure of case 6 is described with reference to FIG. 9. FIG. 9 is a perspective view of another electric double layer capacitor in accordance with the first exemplary embodiment. In this structure, a hole (not shown) for electrolyte injection is disposed in case 6, and rubber plug 22 is engaged with and closes the hole. In other words, an electrolyte is injected into case 6 through the hole disposed in case 6, and then rubber plug 22 is engaged with the hole, thereby sealing case 6.

In the electric double layer capacitor having such a structure, after element 1 is accommodated in case 6 and lid 9 is bonded to case 6, an electrolyte can be injected into case 6. Therefore, in the state where element 1 is not impregnated with the electrolyte, lid 9 can be bonded to case 6 by ultrasonic welding or the like. Thus, the workability is extremely improved.

Two or more holes for electrolyte injection may be disposed per element in case 6, or such a hole may be disposed in lid 9.

Figure 10:
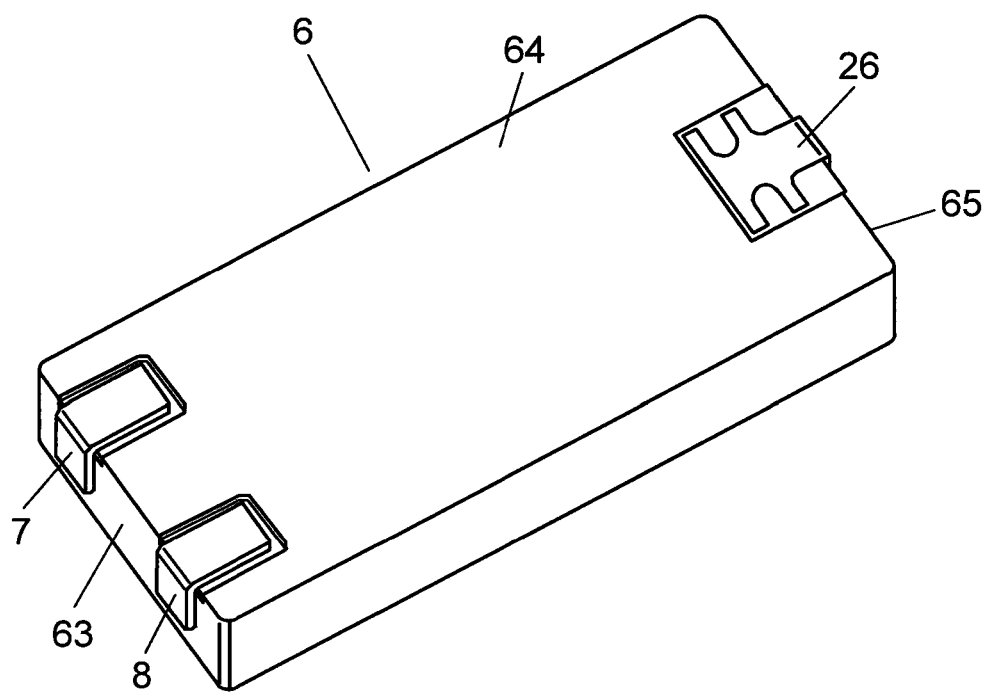
FIG. 10 is a perspective view of yet another electric double layer capacitor seen from a bottom side in accordance with the first exemplary embodiment of the present invention.

Next, preferable shape and structure of a terminal are described with reference to the perspective view of FIG. 10 showing the state seen from the bottom. In this structure, dummy terminal 26 is disposed on side surface 65 on the opposite side to side surface 63 of case 6 which first terminal 7 and second terminal 8 penetrate.

Dummy terminal 26 is insert-molded so as to penetrate side surface 65 of case 6, similarly to first terminal 7 and second terminal 8. Similarly to first terminal 7 and second terminal 8, dummy terminal 26 is folded from side surface 65 that is opposite side surface 63 to outer bottom 64 along the outer surface of case 6.

When the electric double layer capacitor having this structure is surface-mounted, the electric double layer capacitor can be mounted stably without tilting with respect to a circuit board. Soldering can be performed certainly, and hence the connecting reliability is improved.

Dummy terminal 26 shown in FIG. 10 is one example. The shape of dummy terminal 26 and the number of dummy terminals 26 are not limited to this as long as the electric double layer capacitor can be mounted stably without tilting with respect to the circuit board during surface mounting. This structure can be applied also to the second exemplary embodiment.

Next, a structure where two electric double layer capacitors 110 and 210 are coupled is described with reference to FIG. 11. Electric double layer capacitors 110 and 210 have the same structure as that of electric double layer capacitor shown in FIG. 1.

The cases of electric double layer capacitors 110 and 210 are mechanically bonded to each other by a method such as ultrasonic welding or adhesion. First terminal 107 of electric double layer capacitor 110 is connected to second terminal 208 of electric double layer capacitor 210 using intermediate terminal 13. In other words, intermediate terminal 13 connects electric double layer capacitors 110 and 210 in series. This simple structure can make a high withstand voltage higher (improved).

Figure 11:
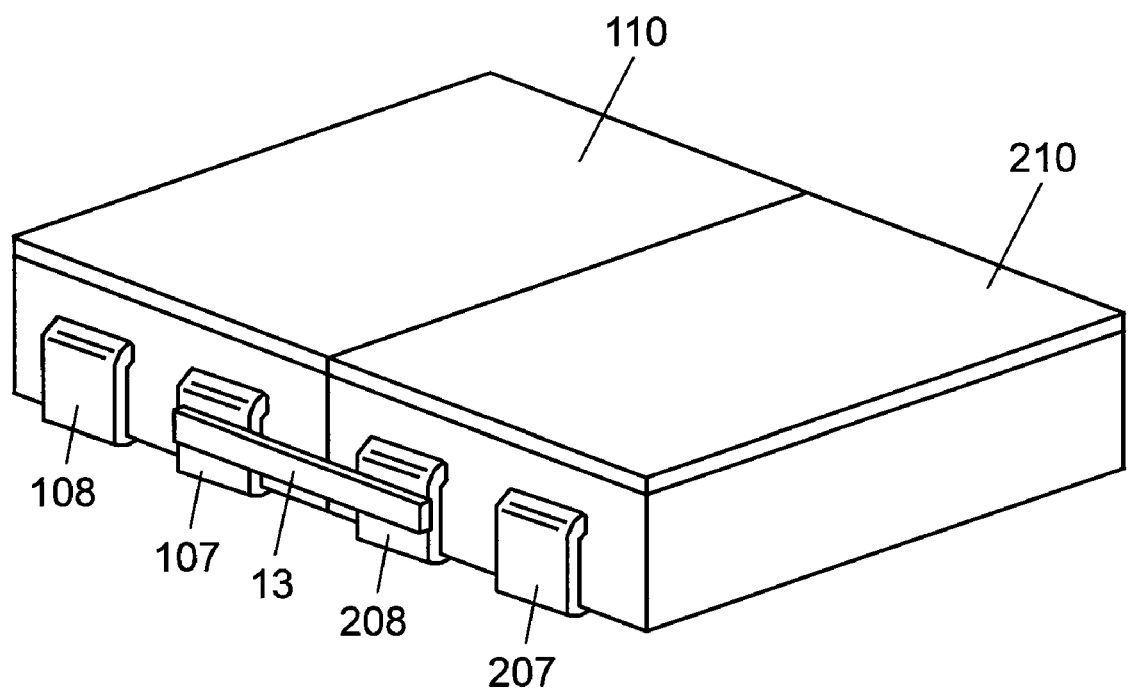
FIG. 11 is a perspective view showing the state where two electric double layer capacitors of FIG. 2B are coupled.

In FIG. 11, as an example, electric double layer capacitors 110 and 210 are coupled horizontally and connected in series. However, the present invention is not limited to this. Three or more electric double layer capacitors may be coupled horizontally or stacked on and coupled to each other, and electric connection may be series connection or parallel connection.

Figure 12A:
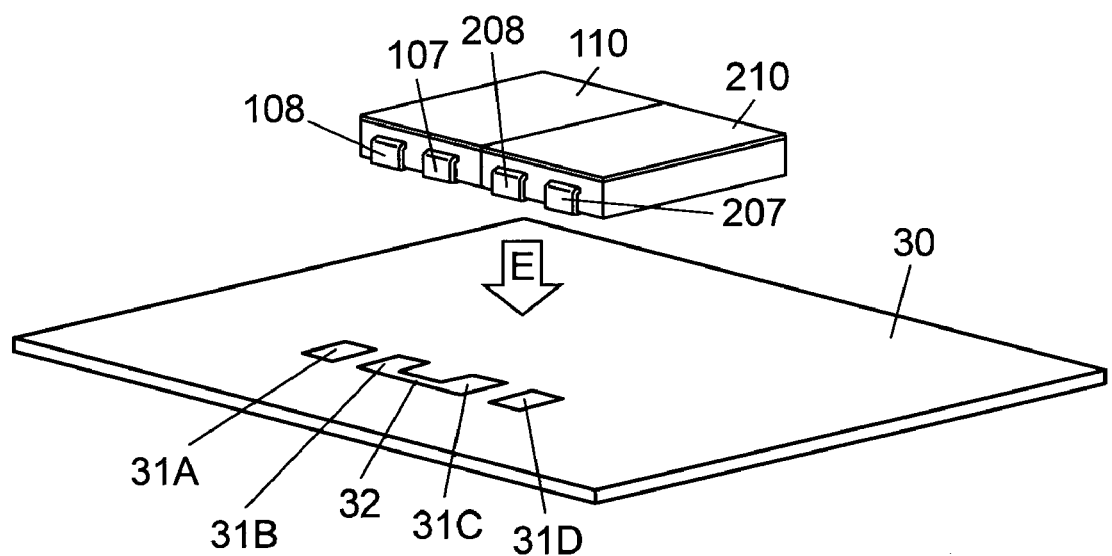
FIG. 12A and FIG. 12B are perspective views showing a structure where two electric double layer capacitors of FIG. 2B are coupled and connected through an external circuit.
Figure 12B:
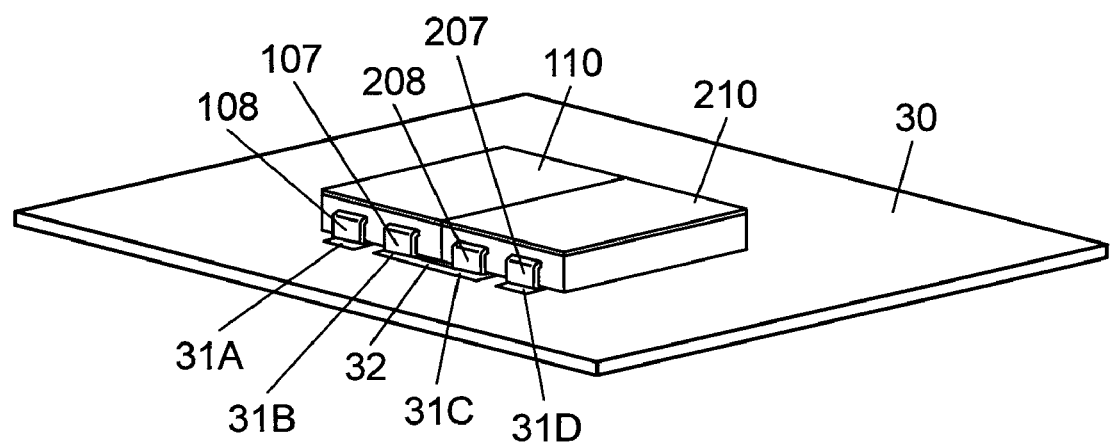

Another method of connecting two electric double layer capacitors is described with reference to FIG. 12A and FIG. 12B. FIG. 12A and FIG. 12B are perspective views showing a structure where electric double layer capacitors 110 and 210 are connected through an external circuit. In the structure of FIG. 11, first terminal 107 and second terminal 208 of adjacent electric double layer capacitors 110 and 210 are connected using intermediate terminal 13. On the other hand, in FIG. 12A and FIG. 12B, respective elements built in electric double layer capacitors 110 and 210 are electrically connected through an external circuit instead of intermediate terminal 13. Similarly to FIG. 11, electric double layer capacitors 110 and 210 are disposed adjacently, and respective cases are mechanically bonded to each other by a method such as ultrasonic welding or adhesion.

Electric double layer capacitors 110 and 210 are mounted on circuit board 30. As shown in FIG. 12A, four land patterns 31A through 31D are disposed correspondingly to the positions of first terminals 107 and 207 and second terminals 108 and 208 on the outer bottoms of electric double layer capacitors 110 and 210. Especially, land patterns 31B and 31C positioned closer to the center are electrically connected through linear bonding pattern 32. In other words, land patterns 31B and 31C and bonding pattern 32 form a C-shape in the top view. In this structure, land patterns 31B and 31C are electrically connected. Electric double layer capacitors 110 and 210 are mounted on circuit board 30 in the arrow E direction, and come into the state shown in FIG. 12B.

As shown in FIG. 12B, first terminals 107 and 207 and second terminals 108 and 208 are disposed on land patterns 31B, 31D, 31A, and 31C, respectively. As discussed above, land patterns 31B and 31C positioned closer to the center are electrically connected through linear bonding pattern 32. First terminal 107 and second terminal 208 disposed on land patterns 31B and 31C are therefore, electrically connected. Thus, the external circuit disposed on circuit board 30 connects the elements accommodated in electric double layer capacitors 110 and 210 in series.

Even when the elements are connected by the external circuit, the withstand voltage can be high with a simple structure. In this structure, first terminal 107 and second terminal 208 are not connected by intermediate terminal 13, and are independent. Therefore, in the state where elements are accommodated in the case, the characteristic of each element can be individually measured and inspected before mounting.

In the present embodiment, the elements of electric double layer capacitors 110 and 210 are connected by circuit board 30. However, the elements may be connected by an external circuit other than this method. Alternatively, three or more electric double layer capacitors may be coupled, or the elements may be connected in parallel.

Second Exemplary Embodiment

Figure 13A:
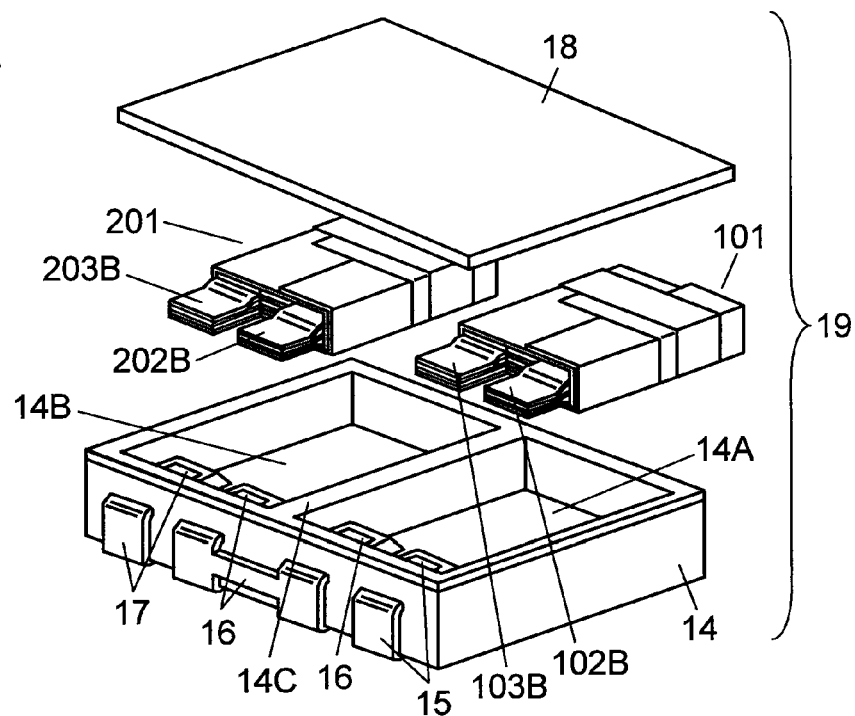
FIG. 13A is an exploded perspective view of an electric double layer capacitor in accordance with a second exemplary embodiment of the present invention.
Figure 13B:
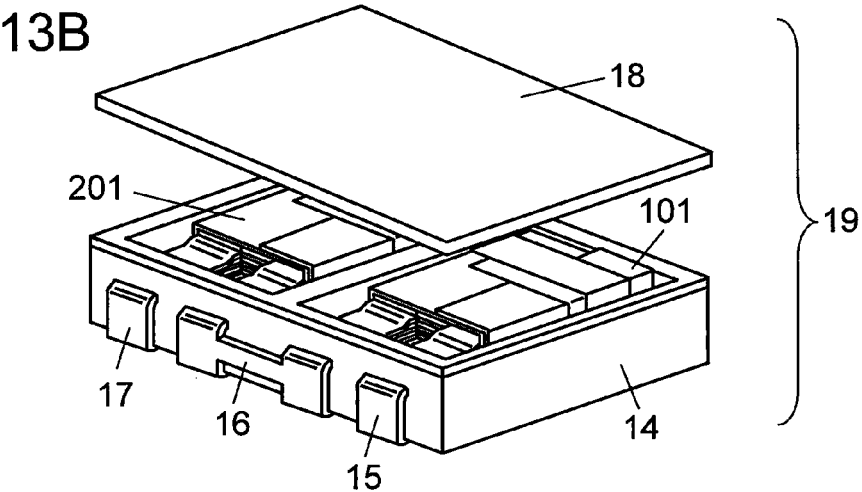
FIG. 13B is a perspective view showing a state before bonding a lid of the electric double layer capacitor shown in FIG. 13A.
Figure 13C:
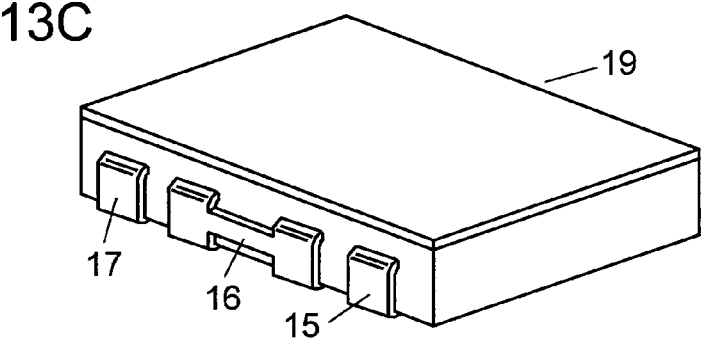
FIG. 13C is a perspective view showing the bonded state of the lid of the electric double layer capacitor shown in FIG. 13B.

FIG. 13A is an exploded perspective view of an electric double layer capacitor in accordance with a second exemplary embodiment of the present invention. FIG. 13B and FIG. 13C are perspective views showing a state of the electric double layer capacitor before bonding a lid, and a bonded state of the lid, respectively. The second exemplary embodiment differs from the first exemplary embodiment in that a plurality of elements used in the electric double layer capacitor described in the first exemplary embodiment are accommodated in one case.

Elements 101 and 201 are structured similarly to element 1 described in the first exemplary embodiment. First lead sections 102B and second lead sections 103B of element 101, and first lead sections 202B and second lead sections 203B of element 201 are led out from the same directions, respectively.

Elements 101 and 201 are accommodated with an electrolyte (not shown) in resin-made case 14 having an opening top surface. Case 14 is made of liquid crystal polymer, for example. Case 14 has independent element storage sections 14A and 14B partitioned by partition 14C for accommodating elements 101 and 201. Partition 14C, in cooperation with lid 18, prevents liquid junction between element storage sections 14A and 14B. Thus, two independent electric double layer capacitors are formed.

First terminal 15 and second terminal 17 are insert-molded so as to penetrate one side of case 14. Intermediate terminal 16 is similarly insert-molded. First terminal 15, second terminal 17, and intermediate terminal 16 have a structure similar to those of first terminal 7 and second terminal 8 shown in FIG. 5.

First lead sections 102B of element 101 are connected to the joint of first terminal 15, and second lead sections 103B are connected to the joint of intermediate terminal 16. First lead sections 202B of element 201 are connected to the joint of intermediate terminal 16, and second lead sections 203B are connected to the joint of second terminal 17. In this structure, elements 101 and 201 are connected in series.

Resin-made lid 18 is disposed so as to close the opening of the top surface of case 14 and is bonded to case 14 by a method such as ultrasonic welding. Lid 18 is made of liquid crystal polymer, for example. By bonding lid 18 to the top surface of case 14, electric double layer capacitor 19 of the present embodiment is formed.

Additionally, it is preferable that two projecting parts (not shown) are disposed so as to rise from a part of the back surface of lid 18 toward the inside, similarly to lid 9 that has been described in the first embodiment using FIG. 6. The projecting parts preferably compress elements 101 and 201 in the stacking direction, respectively.

Regarding electric double layer capacitor 19 having such a structure, the withstand voltage can be high while reduction of the number of components and reduction of working man-hour, in addition to the effect obtained by electric double layer capacitor 10 of the first embodiment. Such electric double layer capacitor 19 can be manufactured accurately.

In the present embodiment, two elements 101 and 201 are stored in case 14, and connected in series, as an example. However, the present invention is not limited to this. Three or more elements may be stored and connected in series or in parallel.

Figure 14:
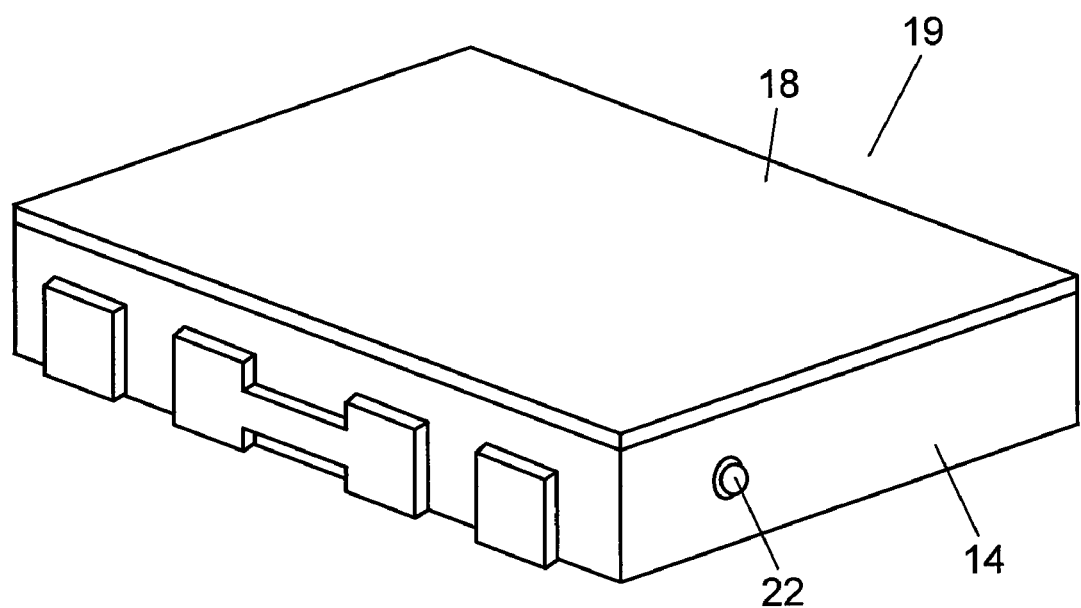
FIG. 14 is a perspective view of another electric double layer capacitor in accordance with the second exemplary embodiment of the present invention.

Next, a more preferable structure of case 14 is described with reference to the perspective view of FIG. 14. Similarly to the first embodiment, a hole (not shown) for electrolyte injection is disposed in case 14, and rubber plug 22 is engaged with the hole in this structure.

Electric double layer capacitor 19 has two independent element storage sections for accommodating two elements. Therefore, a similar hole for electrolyte injection is disposed also on the depth side (the back side) of FIG. 14, and rubber plug 22 is engaged with the hole to seal it. In other words, a hole for electrolyte injection is disposed in case 14 for each independent element storage section, and each hole is blocked by rubber plug 22.

Electric double layer capacitor 19 of the present embodiment having such a structure has an effect similar to that of the first embodiment, and the workability in bonding lid 18 to case 14 is extremely improved.

Meanwhile, two or more holes for electrolyte injection may be disposed for each element in case 14, or lid 18 may have a hole.

Figure 15:
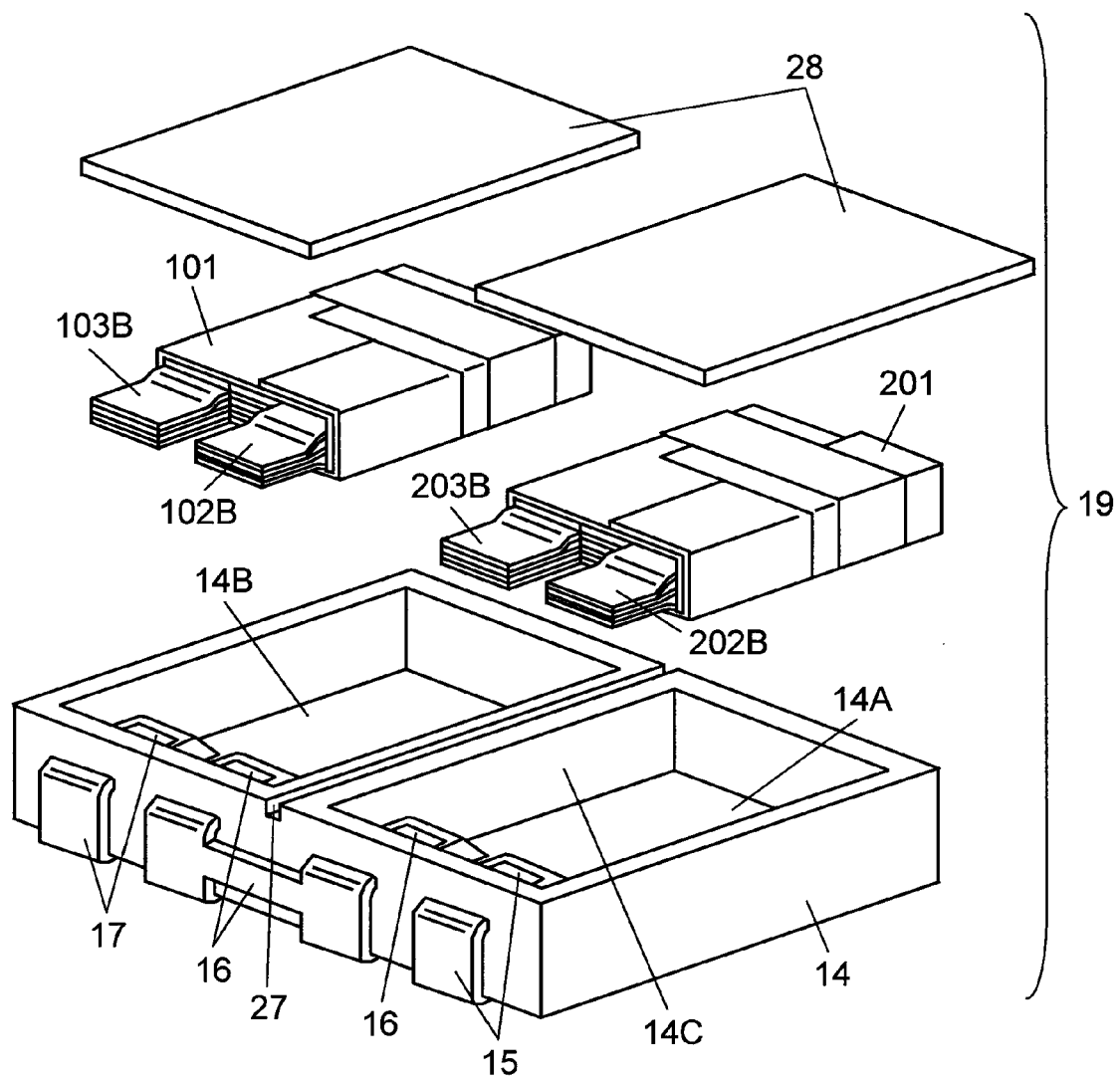
FIG. 15 is an exploded perspective view of yet another electric double layer capacitor in accordance with the second exemplary embodiment of the present invention.
Figure 16:
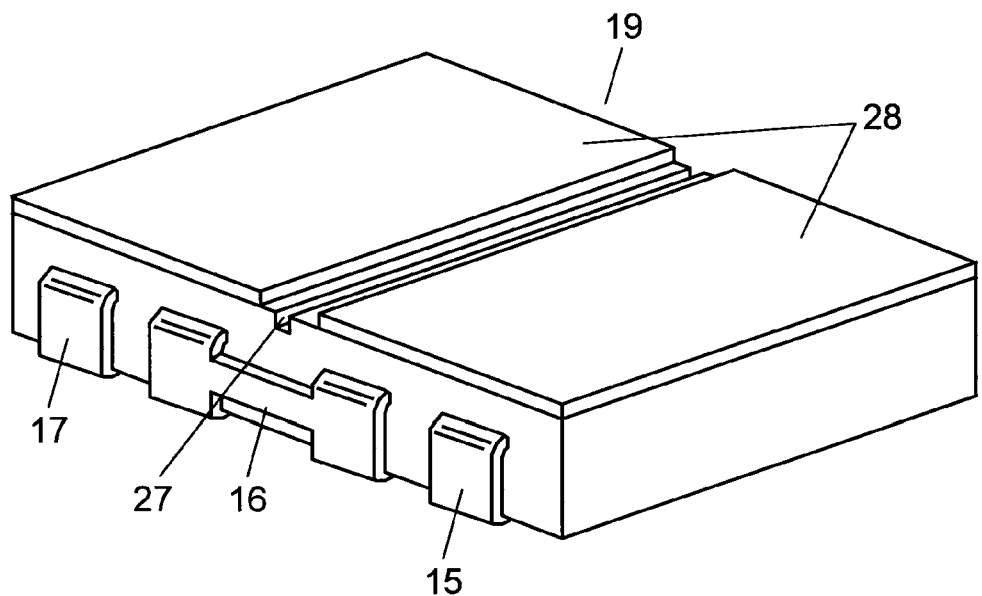
FIG. 16 is a perspective view showing the bonded state of a lid of the electric double layer capacitor shown in FIG. 15.

Next, a preferable exterior structure is described using FIG. 15 and FIG. 16. FIG. 15 is an exploded perspective view of yet another electric double layer capacitor in accordance with the second exemplary embodiment of the present invention. FIG. 16 is a perspective view showing the bonded state of a lid of the electric double layer capacitor shown in FIG. 15. In this structure, groove 27 is disposed in the top surface of partition 14C between adjacent element storage sections 14A and 14B, and element storage sections 14A and 14B are sealed by respective lids 28.

Groove 27 is disposed in the top surface of case 14 so as to divide the plane between element storage sections 14A and 14B. Groove 27 is extended from one end of case 14 to another end opposite the one end, and the parts of case 14 corresponding to both ends of groove 27 are notched. In other words, both ends of groove 27 are opened toward the long side in the top view of case 14. Groove 27 is recessed in a right prism shape. The width of groove 27 is 0.4 mm, and depth thereof is 0.45 mm, for example.

Each resin-made lid 28 seals each of element storage sections 14A and 14B that are disposed independently. Lids 28 are made of liquid crystal polymer, for example, similarly to lid 18. Lids 28 are disposed on the openings of the top surface of case 14 so as to independently seal respective element storage sections 14A and 14B, and are bonded to case 14 by a method such as ultrasonic welding.

Additionally, it is preferable that a projecting part (not shown) is disposed so as to rise from a part of the back surfaces of lid 28 toward the inside, similarly to lid 9 that has been described in the first embodiment shown in FIG. 6. Lids 28 preferably compress elements 101 and 201 in the stacking direction after bonding of them to case 14.

In the electric double layer capacitor having this structure, lids 28 independently seal respective element storage sections 14A and 14B, so that the possibility that the electrolyte leaks from element storage sections 14A and 14B is reduced. In other words, the sealing property of the element storage sections 14A and 14B can be improved comparing with the case where element storage sections 14A and 14B are collectively sealed by one lid 18. As a result, the possibility that the electrolyte leaks through the bonding parts between the case 14 and lids 28 can be reduced.

Since groove 27 is disposed between adjacent element storage sections 14A and 14B, the degradation of elements 101 and 201 can be reduced. More specifically, if the electrolyte in element storage section 14A leaks through the bonding part between the case 14 and lid 28 due to some causes, the leaking electrolyte can come into element storage section 14B. However, since groove 27 is disposed between element storage section 14B and its adjacent element storage section 14A in the present embodiment, the leaking electrolyte drops into groove 27 before reaching element storage section 14B, and accumulates in groove 27.

Thus, in this electric double layer capacitor, groove 27 can prevent the electrolyte from coming into the adjacent element storage section. Thus, the possibility of liquid junction of the electrolyte caused by liquid leakage can be reduced. As a result, the degradation of the adjacent element can be reduced.

Especially, when element 101 is connected to element 201 in series, liquid junction of the electrolyte causes element 101 and element 201 to function as one element. When usual voltage is applied in this state, excessive voltage is therefore applied to each of element 101 and element 201. The degradation of the elements is therefore accelerated. As a result, this electric double layer capacitor is effective, especially when element 101 is connected to element 201 electrically in series. The shape of groove 27 is not limited to the right prism shape. For example, even when the sectional shape of the groove is circular arc shape or the like, equivalent effect can be produced.

Figure 17:
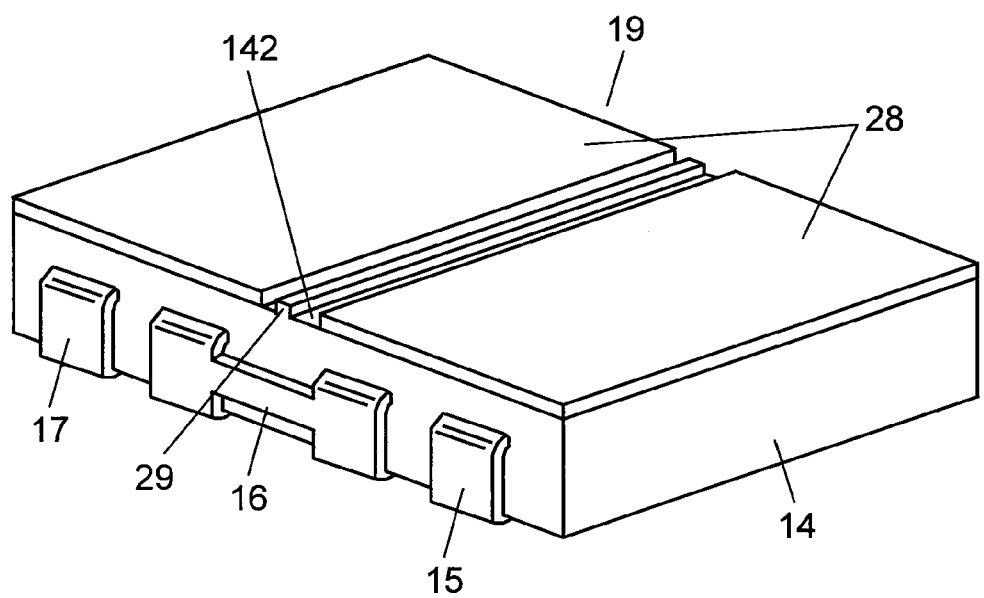
FIG. 17 is a perspective view of still another electric double layer capacitor in accordance with the second exemplary embodiment of the present invention.
Figure 18:
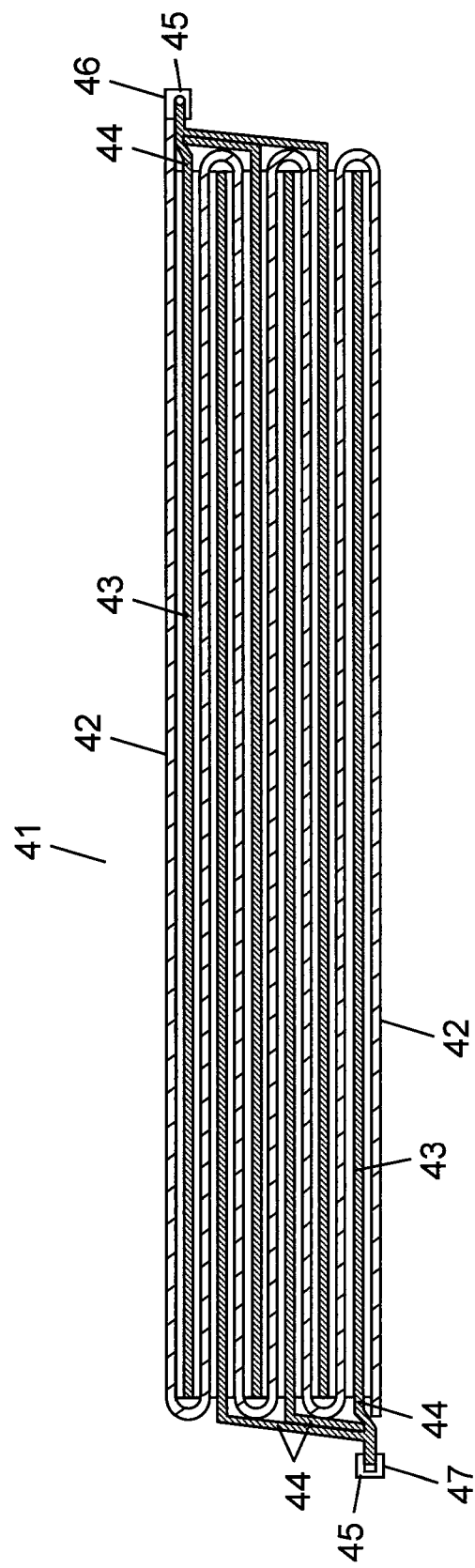
FIG. 18 is a sectional view of a conventional electric double layer capacitor.

Instead of groove 27, wall 29 projecting from top surface 142 may be disposed between adjacent element storage sections 14A and 14B as shown in the perspective view of FIG. 17. Similarly to the case having groove 27, even if the electrolyte in element storage section 14A leaks through the bonding part between the case 14 and lid 28, for example, wall 29 prevents the leaking electrolyte from coming into element storage section 14B. The possibility that the liquid junction occurs between adjacent element storage sections 14A and 14B is reduced. As a result, the possibility of the liquid junction of the electrolyte is reduced, and the degradation of elements 101 and 201 can be reduced.

In the structure of FIG. 12A and FIG. 12B described in the first embodiment, electric double layer capacitors 110 and 210 are coupled, and the elements stored in electric double layer capacitors 110 and 210 are connected by the external circuit. This structure can be applied to electric double layer capacitor 19 where a plurality of elements are individually stored in one case as shown in the present embodiment. In other words, without disposing intermediate terminal 16, the plurality of elements may be connected by the external circuit. The following electric double layer capacitor may be formed: a pair of first terminal and second terminal corresponding to independent element storage sections disposed in one case are disposed instead of intermediate terminal 16, a plurality of elements are accommodated in respective element storage sections, then the terminals are connected by intermediate terminal 13 as shown in FIG. 11.

In the second embodiment, case 14 having two element storage sections 14A and 14B is used. However, a plurality of cases 6 each of which has one element storage section may be coupled as in the first embodiment, and the coupled product is used as a final case. In this structure, a part corresponding to groove 27 or wall 29 may be previously disposed in each case, and these cases are combined together so as to form a shape similar to that of case 14 shown in FIG. 15 through FIG. 17.

The example using element 1 of the first embodiment has been described in the second embodiment; however, element 11 may be used or both of them may be used together. A winding type element may be used.

As described above, in the electric double layer capacitors of the present invention, the number of components and working man-hour can be reduced with a simple structure. As a result, the cost can be reduced, and the size and resistance can be decreased. These electric double layer capacitors are useful in a field for assisting various power sources.

What is claimed is:

1. An electric double layer capacitor comprising:
an element including:
a first electrode having a first lead section;
a second electrode having a second lead section that projects in the same direction as the first lead section; and
a separator interposed between the first electrode and the second electrode;
a first terminal connected to the first lead section and a second terminal connected to the second lead section;
an electrolyte impregnated in the element;
a resin-made case accommodating the element, and having an inner bottom, a first surface facing the inner bottom, and a side surface adjacent to the first surface, the first surface being opened; and
a resin-made lid bonded to the first surface of the case,
wherein the first terminal has a first joint including a first joint surface to which the first lead section is joined, a first intermediate conductive section extended from the first joint, and a first terminal section further extended from the first intermediate conductive section,
the second terminal has a second joint including a second joint surface to which the second lead section is joined, a second intermediate conductive section extended from the second joint, and a second terminal section further extended from the second intermediate conductive section,
the first and second joints are disposed at positions closer to the first surface than the inner bottom of the case,
the first and second joint surfaces are exposed toward the first surface,
the rims of the first and second joints and the first and second intermediate conductive sections are buried in the case, and
the first and second terminal sections are led from the side surface of the case to outside,
wherein the first electrode is one of a plurality of first electrodes, the second electrode is one of a plurality of second electrodes, the element has the plurality of first electrodes and the plurality of second electrodes, and the first electrodes and the second electrodes are stacked on each other through the separator,
each of the first electrodes has:
a first current collector formed of a metal foil that is formed by integrally disposing the tongue-shaped first lead section at an end of one side of a square; and
a first polarized electrode layer formed on a part of the first current collector other than the first lead section,
each of the second electrodes has:
a second current collector formed of a metal foil that is formed by integrally disposing the tongue-shaped second lead section at an end of one side of a square; and
a second polarized electrode layer formed on a part of the second current collector other than the second lead section,
the separator has a band shape and is folded in a zigzag shape to form a plurality of continuous sheets,
the first electrodes and the second electrodes are alternately inserted between the sheets of the separator from the opposite directions, and
the first lead sections and second lead sections are arranged at the opposite ends of a same side of the element, and
wherein in two of the second electrodes positioned on an uppermost and a lowermost in the stacking direction, the polarized electrode layer is formed on only one surface of the current collector except the second lead section, and the polarized electrode layers of the second electrodes positioned on the uppermost and the lowermost are in contact with the sheets of the separator positioned on the uppermost and the lowermost, respectively.

2. The electric double layer capacitor according to claim 1, wherein the first and second intermediate conductive sections are folded in the resin forming the case.

3. The electric double layer capacitor according to claim 1, wherein a coating layer of fluororesin is disposed in at least parts of the first and second terminals buried in the case.

4. The electric double layer capacitor according to claim 1, wherein widths of the first lead sections and the second lead sections are smaller than ½ of whole width of the side on which the first and second lead sections are formed.

5. The electric double layer capacitor according to claim 1 further comprising a stainless steel wound on a peripheral surface of the element.

6. The electric double layer capacitor according to claim 1, wherein a hole is disposed in the case, and a rubber plug is engaged with the hole to seal the hole.

7. The electric double layer capacitor according to claim 1, wherein the distances from the inner bottom to the first and second joint surfaces are substantially ½ of dimension of the element in the direction from the inner bottom to the first surface.

8. The electric double layer capacitor according to claim 1 further comprising a dummy terminal folded along an outer peripheral surface of the case and coming around to an outer bottom of the case on an opposite side to the first and second terminals.

9. An electric double layer capacitor comprising:
an element including:
a first electrode having a first lead section;
a second electrode having a second lead section that projects in the same direction as the first lead section; and
a separator interposed between the first electrode and the second electrode;
a stainless steel wound on a peripheral surface of the element;
a first terminal connected to the first lead section and a second terminal connected to the second lead section;
an electrolyte impregnated in the element;
a resin-made case accommodating the element, and having an inner bottom, a first surface facing the inner bottom, and a side surface adjacent to the first surface, the first surface being opened; and
a resin-made lid bonded to the first surface of the case,
wherein the first terminal has a first joint including a first joint surface to which the first lead section is joined, a first intermediate conductive section extended from the first joint, and a first terminal section further extended from the first intermediate conductive section,
the second terminal has a second joint including a second joint surface to which the second lead section is joined, a second intermediate conductive section extended from the second joint, and a second terminal section further extended from the second intermediate conductive section,
the first and second joints are disposed at positions closer to the first surface than the inner bottom of the case,
the first and second joint surfaces are exposed toward the first surface, the rims of the first and second joints and the first and second intermediate conductive sections are buried in the case, and
the first and second terminal sections are led from the side surface of the case to outside,
wherein the first electrode is one of a plurality of first electrodes, the second electrode is one of a plurality of second electrodes, the separator is one of a plurality of sheet-shaped separators, the element has the plurality of first electrodes, the plurality of second electrodes, and the plurality of separators, and the first electrodes and the second electrodes are stacked on each other through the respective separators,
each of the first electrodes has:
a first current collector formed of a metal foil that is formed by integrally disposing the tongue-shaped first lead section at an end of one side of a square; and
a first polarized electrode layer formed on a part of the first current collector other than the first lead section,
each of the second electrodes has:
a second current collector formed of a metal foil that is formed by integrally disposing the tongue-shaped second lead section at an end of one side of a square; and
a second polarized electrode layer formed on a part of the second current collector other than the second lead section, and the first lead sections and second lead sections are arranged at the opposite ends of a same side of the element.

10. The electric double layer capacitor according to claim 9, wherein widths of the first lead sections and the second lead sections are smaller than ½ of whole width of the side on which the first and second lead sections are formed.

11. The electric double layer capacitor according to claim 9, wherein in two of the second electrodes positioned on an uppermost and a lowermost in the stacking direction, the polarized electrode layer is formed on only one surface of the current collector except the second lead section, and the polarized electrode layers of the second electrodes positioned on the uppermost and the lowermost are in contact with the respective separators positioned on the uppermost and the lowermost, respectively.

12. An electric double layer capacitor comprising:
an element including:
a first electrode having a first lead section;
a second electrode having a second lead section that projects in the same direction as the first lead section; and
a separator interposed between the first electrode and the second electrode;
a first terminal connected to the first lead section and a second terminal connected to the second lead section;
an electrolyte impregnated in the element;
a resin-made case accommodating the element, and having an inner bottom, a first surface facing the inner bottom, and a side surface adjacent to the first surface, the first surface being opened; and
a resin-made lid bonded to the first surface of the case,
wherein the first terminal has a first joint including a first joint surface to which the first lead section is joined, a first intermediate conductive section extended from the first joint, and a first terminal section further extended from the first intermediate conductive section,
the second terminal has a second joint including a second joint surface to which the second lead section is joined, a second intermediate conductive section extended from the second joint, and a second terminal section further extended from the second intermediate conductive section,
the first and second joints are disposed at positions closer to the first surface than the inner bottom of the case,
the first and second joint surfaces are exposed toward the first surface,
the rims of the first and second joints and the first and second intermediate conductive sections are buried in the case, and
the first and second terminal sections are led from the side surface of the case to outside,
wherein the element is one of a plurality of elements and the electric double layer capacitor comprises the plurality of elements, and
an inside of the case is partitioned by a partition so that a plurality of independent element storage sections are disposed in the case, and each of the plurality of elements is disposed in each of the plurality of element storage sections, and
wherein the lid is one of a plurality of lids, the electric double layer capacitor comprises the plurality of lids, and each of the plurality of lids seals each of the plurality of element storage sections.

13. The electric double layer capacitor according to claim 12, wherein holes are disposed in the case corresponding to the respective element storage sections, and rubber plugs are engaged with the respective holes to seal the holes.

14. The electric double layer capacitor according to claim 12, wherein the distances from the inner bottom to the first and second joint surfaces are substantially ½ of dimension of the elements in the direction from the inner bottom to the first surface.

15. The electric double layer capacitor according to claim 12 further comprising a dummy terminal folded along an outer peripheral surface of the case and coming around to an outer bottom of the case on an opposite side to the first and second terminals.

16. The electric double layer capacitor according to claim 12, wherein one of a groove and a wall projecting from the first surface are disposed between adjacent element storage sections on the first surface of the case.

* * * * *